Feb. 25, 1969  J. F. SARVER ET AL  3,430,089
CALCIUM HALOPHOSPHATE PHOSPHORS
Filed Sept. 16, 1965
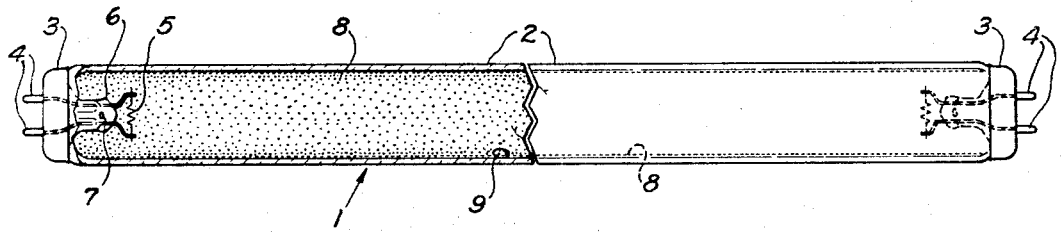
Inventors:
James F. Sarver
Eugene F. Apple
by Richard H. Burgess
Their Attorney

United States Patent Office 3,430,089
Patented Feb. 25, 1969

3,430,089
CALCIUM HALOPHOSPHATE PHOSPHORS
James F. Sarver, Cleveland, and Eugene F. Apple, Highland Heights, Ohio, assignors to General Electric Company, a corporation of New York
Filed Sept. 16, 1965, Ser. No. 487,845
U.S. Cl. 313—109  10 Claims
Int. Cl. C09k 1/36; H01j 61/44

ABSTRACT OF THE DISCLOSURE

Improved calcium halophosphate phosphors, processes of making them, and lamps utilizing the phosphors, wherein small amounts of divalent zinc up to about 0.35 mole percent relative to the total divalent ion content of the phosphor are added to the phosphor to improve light-output maintenance. About from 0.01 to 0.5 mole percent divalent cadmium may also be present. Maintenance improvement appears to result both from a decrease in color-center formation and a decrease in oxidation of manganese from the divalent state to the trivalent state.

---

This invention relates generally to phosphors and more particularly to calcium halophosphate phosphors. Such phosphors are useful in fluorescent lamps as well as in other applications.

Calcium halophosphate phosphors have the general formula $$3Ca_3(PO_4)_2 \cdot CaX_2:Mn, Sb$$

wherein X is one or more halogens, generally a mixture of fluorine and chlorine. Mn is generally considered to be a primary activator while Sb is considered to be co-activator or a sensitizer, or both. Activators in phosphors act as luminescence centers and actually emit light to provide the light output of the phosphor. The matrix or host crystal (calcium halophosphate having an apatite structure in this case) absorbs incident radiant energy such as from a low pressure mercury arc in a fluorescent lamp, and then transmits this energy through the lattice to the activators. At the activators, the energy is converted to light which is then emitted out through the host crystal. Sensitizers serve to enhance absorption of incident radiation and the transfer of the energy therefrom to the activators for the production of useful light.

Thus, it is seen that there are four phenomena in the fluorescent process which are critical to efficient light production. These are:

(1) The absorption of exciting energy in the host crystal, (2) The transfer of the absorbed energy through the crystal to the luminescence centers or activator ions, (3) The efficiency of conversion of the absorbed energy into luminescence in the activator, with most of the residual energy being wasted as heat, and (4) The transmission of the generated light out of the phosphor crystal, i.e., the avoidance of absorption of the generated light before it emerges from the crystal and is available for use.

The present invention is directed to a means for improving the maintenance of light output of phosphors of the invention by minimizing the tendency of the host crystal lattice to progressively and nonproductively absorb increasing amounts of the incident radiation, and, particularly, of the light output from the luminescence centers.

In fluorescent lamps a low pressure mercury arc discharge having a principal wavelength of 2537 angstrom units (A.) and one minor wavelength of 1849 A. is used to excite a crystalline phosphor coated on the inner surfaces of the lamp tube. Calcium halophosphate phosphors exhibit a strong absorption for the 2537 A. radiation from the mercury arc, resulting in useful light output. The 1849 A. radiation is known to progressively degrade the light output of the phosphor over the useful life of a lamp. This is brought about at least in part by the formation of radiation-absorbing crystalline defects in the phosphor known as "color centers." These color centers absorb light radiated from the luminescence centers or activators, and they may also have the effect of absorbing incident exciting radiation such as the 2537 A. useful radiation from the mercury arc. Various types of color centers are known including halide ion vacancies occupied by trapped electrons and known as F-centers, electrons trapped in electronic level traps known as F'-centers, calcium ion vacancies, hydrogen ions substituted for halide ions and combined with trapped excited electrons known as U-centers, and various other types of crystallographic-electronic defects. Not all of these types of color centers may be present in phosphors of the invention, and other types may be involved. Since such color centers wastefully absorb light (or exciting radiant energy), converting it into heat or other nonuseful forms of energy, and generally cause a graying of the phosphor's body color, it is quite desirable to prevent the formation of the color centers or overcome or avoid their effects. In addition to this effect of color centers, it has been shown that $Mn^{+2}$ is oxidized to $Mn^{+3}$ by 1849 A. radiation. Since $Mn^{+3}$ is not an activator in the halophosphate and since it does absorb 2537 A. radiation (without emission), this photooxidation leads to further brightness losses in the phosphors.

Although the $Cd^{+2}$ ion in partial substitution for Ca has been found to have some useful effects in minimizing color-center formation damage and reducing the oxidation of $Mn^{+2}$ to $Mn^{+3}$, essentially eliminating the calcium halophosphate phosphor color-center absorption band which peaks at 4500 A., it does cause increased absorption at 3500 A. and shorter wavelengths larger in magnitude than comparable phosphors not containing cadmium. Also, cadmium is quite expensive and can be in limited supply in times when the need for it in plated metals is exceptionally high. Thus, alternative and improved phosphor compositions are valuable.

Therefore, an object of the present invention is to provide an improved phosphor composition that is resistant to certain light-output-maintenance-reducing effects.

A further object of the invention is to provide a means for minimizing deleterious effects of color-center formation and $Mn^{+2}$ oxidation to $Mn^{+3}$ in calcium haliphosphate phosphors and lamps using different materials.

Still another object of the invention is to provide efficient processes for the production of such improved phosphors.

Also included as an object of the invention is the provision of improved fluorescent lamps in which the advantages of such improved phosphors of the invention can be utilized beneficially.

Further objects and advantages of the invention will appear from the following detailed description of species thereof and from the accompanying drawing.

The sole figure of the drawing is an illustration of one type of fluorescent lamp of the present invention.

Briefly stated, the present invention in one aspect provides for the addition of divalent zinc ($Zn^{+2}$) in calcium halophosphate phosphors in amounts from a small amount effective to improve light-output maintenance caused by such deleterious effects as color-center formation and Mn oxidation, to as much as about 0.35 mole percent. Percentages herein are molar in relation to the total divalent ion content. As an example, for a halophosphate phosphor having a composition $R_{10}X_2(PO_4)_6$, where X is a mixture of fluorine and chlorine and R is the total content of calcium and other elements substituted for calcium including divalent manganese, antimony, cadmium, and zinc, 0.02 mole of zinc would be equivalent to 0.2% content of $Zn^{+2}$ in the calcium positions in the lattice, i.e., in relation to the total divalent ion (R) content of ten moles. This zinc can be used either as the sole additive or in combination with cadmium as known in the prior art in small retained amounts from about 0.05 to 0.35 mole percent. The effects appear to be at least additive. Although the minimum preferred amount of zinc for the achievement of the objects of the invention has not been precisely identified, retained zinc alone in amounts of 0.16 percent and zinc at 0.06 percent in combination with 0.35 percent cadmium have been found to be quite useful in increasing light output maintenance while still retaining good initial light production. The cadmium content can preferably be in the range of 0.01–0.5 percent. Since the desirable effects of the phosphor composition improvements of the invention are realized when the phosphor is exposed to radiation which causes the formation of deleterious color centers in addition to useful light-producing radiation, the invention also embodies devices including lamps which usefully subject the phosphors to such radiations for the production of useful light. Novel and unobvious methods for the production of phosphors of the invention involve providing the ingredients of the phosphor in a manner such as to avoid the formation of poor-body-color diluents such as zinc metaantimonate, $ZnSb_2O_6$ the occurrence of which appears to be enhanced by a chloride vapor transport mechanism. This can be minimized by providing the chlorine in less volatile forms. More stable sources of chlorine can be such as manganese chloroapatite,

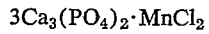

$$3Ca_3(PO_4)_2 \cdot MnCl_2$$

or calcium chloroapatite, $3Ca_3(PO_4)_2 \cdot CaCl_2$ as the sole source of chloride, see Patent 2,904,516–Ross et al., assigned to the assignee of the present invention. Zinc, and in some instances antimony, can be provided as

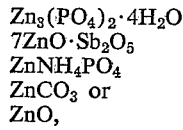

$$Zn_3(PO_4)_2 \cdot 4H_2O$$
$$7ZnO \cdot Sb_2O_5$$
$$ZnNH_4PO_4$$
$$ZnCO_3 \text{ or}$$
$$ZnO,$$

preferably as $Zn_3(PO_4)_2 \cdot 4H_2O$.

Apparently, the cadmium of the prior art and zinc of the present invention either minimize the formation of whatever color centers would otherwise form, or decrease Mn oxidation, or both in calcium halophosphate phosphors or minimize such effects by various unknown mechanisms. One possible contributing mechanism among many is the preferential absorption of 1849 A. radiation before the radiation can be completely used in the formation of deleterious color centers.

We have found that zinc in the specified amounts is useful in minimizing light output maintenance depreciation in phosphors and in lamps using these phosphors. As described below, zinc seems to be more effective than cadmium in the same molar quantities, and can be used effectively in combination with cadmium or alone. Some lamps of the prior art use calcium halophosphate phosphors containing about one percent cadmium; lamps with improved maintenance can be made with phosphors containing about 0.06% zinc and 0.35% cadmium, or about 0.16% zinc even in the absence of cadmium.

In the drawing, a fluorescent lamp that can be used to take advantage of the present invention is shown at 1, with the left half sectioned to show the interior elements and the coating of phosphor, and the right half not sectioned but the interior parts shown in dashed lines. A tubular glass envelope 2 is provided with a base 3 on each end. In this particular lamp design, two pins 4 protrude from the bases on each end of the lamp. These pins are connected to lead-in wires which are sealed through an insulating glass stem press 6 which is vitreously sealed to the lamp envelope 2. An exhaust port 7 for exhausting and filling the lamp with the desired ionizable starting gas such as argon or an argon-nitrogen mixture is provided in at least one of the stem presses 6. An electrode 5 is attached to the inner ends of the leads which are electrically connected to the pins 4. The inner tubular surfaces of the lamp are coated with a phosphor 8 according to the invention. Also, a small quantity of mercury 9 is provided in the lamp. This mercury droplet 9 is vaporized and ionized during operation of the lamp at a mercury vapor pressure in the order of 10 microns to provide the 2537 A. radiation for excitation of the phosphor along with 1849 A. radiation. As will be understood in the art, many variations of this design can be made and full advantage still taken of the invention.

Lamp tests were made with phosphors produced by conventional techniques but also having incorporated into them some zinc or cadmium, or both together. These phosphors were made by techniques generally known in the art. A typical batch would include in parts by weight:

| | |
|---|---|
| $CaHPO_4$ | 13.880 |
| $CaCO_4$ | 4.387 |
| $CaF_2$ | 1.173 |
| $NH_4Cl$ | 0.338 |
| $MnCO_3$ | 0.367 |
| $Sb_2O_3$ | 0.450 |
| $CdO$ | 0.208 |
| $ZnO$ | 0.0132 |

This batch would be thoroughly mixed and fired in a covered vessel in air at about 1150° C. for 2–4 hours, then milled and refired under similar condutions.

Table I below shows the amounts of zinc and cadmium added, the amounts of zinc retained, the weight percent of soluble antimony, and plaque brightnesses as a percentage of a standard phosphor for each test. Soluble antimony is analyzed for by dissolution of the phosphor in hydrochloric acid and represents the amount of antimony actually incorporated in the phosphor crystal structure. Other antimony is present as insoluble zinc metaantimonate, $ZnSb_2O_6$, an undesirable, gray-colored diluent. Also some antimony volatilizes from the batch. Preferably, in one form, the antimony content should be about 0.8–1.0 weight percent of the phosphor. Zinc contents have been measured by X-ray fluorescence analysis, and cadmium retention values were established by wet chemical analysis. About 80 percent of added cadmium is generally retained, and 60 percent of the zinc.

TABLE I.—TEST PHOSPHOR COMPOSITIONS

| Test | Mole percent added | | Mole percent $Zn^{+2}$ retained | Sol. Sb (wgt. percent) | Plaque bright. (percent) |
|---|---|---|---|---|---|
| | Zn | $Cd^{+2}$ | | | |
| A | 0.0 | 1.0 | 0.0 | 0.79 | 103.6 |
| B | 0.0 | 0.5 | 0.0 | 0.75 | 102.8 |
| C | 0.1 | 0.5 | 0.06 | 0.75 | 100.2 |
| D | 0.2 | 0.5 | 0.12 | 0.75 | 100.2 |
| E | 0.2 | 0.4 | 0.13 | 0.77 | 101.5 |
| F | 0.5 | 0.0 | 0.34 | 0.74 | 96.0 |
| G | 0.4 | 0.0 | 0.25 | 0.73 | 97.2 |
| H | 0.3 | 0.0 | 0.18 | 0.73 | 98.5 |

Certain of these phosphors were coated into 40-watt standard fluorescent lamps commercially designated as F40T12 and their light output tested over a 500-hour period. The phosphors were formulated to give a cool white composition. Since plaque brightnesses for tests F and G were somewhat less than for the others, lamps were not made with these phosphors. Although this indicates that phosphors containing more than about 0.35 percent zinc would not be satisfactory, we consider that the 0.35 percent zinc phosphors would still retain the advantages of the invention to a useful extent. The results of these tests are given in Table II below. Test A having an added cadmium content of one percent is used as a control to show the differences in light output characteristics caused by the varying compositions. L. stands for lumens, l.p.w. means lumens per watt, and the percent maintenance is based on the zero hour l.p.w. data. The Table II data are based on normal testing consisting of keeping the lamps lighted for three hours, then off for twenty minutes, and running the test at design voltages and amperages.

TABLE II.—NORMAL TEST

| Test | 0 hour | | 100 hours | | | 500 hours | | |
|---|---|---|---|---|---|---|---|---|
| | L. | L.p.w. | L. | L.p.w. | Percent maint. | L. | L.p.w. | Percent maint. |
| A | 3,248 | 76.3 | 3,155 | 76.7 | 97.9 | 3,100 | 73.7 | 96.6 |
| B | 3,215 | 75.6 | 3,114 | 73.8 | 97.6 | 3,080 | 73.3 | 97.0 |
| C | 3,162 | 74.3 | 3,077 | 72.9 | 98.1 | 3,041 | 72.4 | 97.4 |
| D | 3,172 | 74.7 | 3,115 | 73.8 | 98.7 | 3,059 | 72.8 | 97.5 |
| E | 3,207 | 75.5 | 3,131 | 74.2 | 98.3 | 3,081 | 73.3 | 97.1 |
| H | 3,148. | 74.0 | 3,086 | 72.9 | 98.5 | 3,021 | 71.9 | 97.2 |

Table III below presents the results from a force test designed to predict long lift operating characteristics of the lamps with the various phosphors. The test was conducted continuously at an elevated amperage of about 1.5 amps. Three hundred hours of this force test is equivalent to about 2000 hours normal operation.

TABLE III.—FORCE TEST

| Test | 0 hour | | 100 hours | | | 300 hours | | |
|---|---|---|---|---|---|---|---|---|
| | L. | L.p.w. | L. | L.p.w. | Percent maint. | L. | L.p.w. | Percent maint. |
| A | 3,283 | 76.8 | 2,999 | 71.8 | 93.5 | 2,884 | 68.8 | 89.6 |
| B | 3,217 | 75.6 | 2,938 | 70.6 | 93.4 | 2,823 | 67.5 | 89.3 |
| C | 3,203 | 75.3 | 2,992 | 71.5 | 95.0 | 2,849 | 68.2 | 90.6 |
| D | 3,204 | 75.2 | 2,981 | 71.2 | 94.7 | 2,879 | 68.2 | 90.7 |
| E | 3,222 | 76.1 | 2,988 | 71.2 | 93.6 | 2,886 | 68.5 | 90.0 |
| H | 3,160 | 74.4 | 2,967 | 70.9 | 95.3 | 2,859 | 67.7 | 91.0 |

Table IV lists ICI color coordinate values measured from each of the tests after 100 hours of burning.

TABLE IV.—COLOR COORDINATES 100 HOURS

| Test | x | y |
|---|---|---|
| A | 0.3748 | 0.3764 |
| B | 0.3728 | 0.3739 |
| C | 0.3733 | 0.3739 |
| D | 0.3733 | 0.3754 |
| E | 0.3733 | 0.3746 |
| H | 0.3733 | 0.3741 |

These color values show that the brightness values obtained are results of chemical composition and not of any significant color shift. Also absorption measurements show that the results are not caused by any significant difference in absorption of 2537 A. radiation.

Direct measurements are made of the resistance to 1849 A. radiation damage in phosphors of various compositions prepared by different processes and with different intermediate materials. Approximately 200-gram batches were prepared by wet-milling the intermediates for one hour in acetone. Phosphors were then produced from 65-gram-batch quantities in telescoping vitreous silica crucibles. The samples were single-fired for one hour at 1100° C. (except where otherwise indicated) in an atmosphere essentially neutral to the reactants, such as largely nitrogen of carbon dioxide.

These phosphors approximated a cool white halophosphate composition, but had a slightly warmer color than standard cool white due to a slightly higher manganese content (about 10 percent higher Mn than in regular cool white). This would normally be expected to make the phosphor more susceptible to damage by 1849 A. radiation, thus increasing the sensitivity of the test. The batch molar formulation used was as follows:

| | Moles |
|---|---|
| $CaHPO_4$ (Ca/$PO_4$=1.022) | 0.7948 |
| $CaCO_3$ | 0.3291 |
| $CaF_2$ | 0.1509 |
| $3Ca_3(PO_4)_2 \cdot MnCl_2$ | 0.0325 |
| $Sb_2O_3$ | 0.0154 |
| RO | 0.0164 | where R=Ca, Cd, or Zn or combinations thereof. Cd was added as $CdNH_4PO_4 \cdot H_2O$.

As an example, this composition required the following quantities of intermediates when 0.4 mole percent zinc was added in place of calcium, with the zinc being introduced as $Zn_3(PO_4)_2 \cdot 4H_2O$:

| | Grams |
|---|---|
| $CaHPO_4$ | 109.69 |
| $CaCO_3$ | 34.34 |
| $CaF_2$ | 11.78 |
| $3Ca_3(PO_4)_2 \cdot MnCl_2$ | 36.20 |
| $Sb_2O_3$ | 4.48 |
| $Zn_3(PO_4)_2 \cdot 4H_2O$ | 1.0059 |

Table V below presents batch (added) and phosphor (retained) compositions, firing temperatures, brightness and 1849 A. resistance measurements for phosphor plaques of varying compositions and using different compounds for supplying the zinc. Each phosphor composition was exposed to 1849 A. radiation from a quartz-wall lamp in nitrogen gas for thirty minutes along with a typical commercial cool white halophosphate phosphor herein referred to as CWH. Brightness is measured with an eye-sensitivity corrected photocell in percentages of a CWH phosphor plaque. The loss in brightness upon exposure to 1849 A. is shown for the test phosphor as well as for the CWH sample tested at the same time, and the difference (Δ) between the loss of the test phosphor and the CWH sample is shown in the last column. A positive value in this column is indicative of results superior to the CWH sample, and a negative value indicates more damage to the test phosphor than to CWH. The variation in CWH loss is dependent on unknown factors that cause differences in brightness measurements from day to day, however, comparing the test phosphors at the same time with CWH in each case effectively cancels these variations. All brightness values represent an average of two separate determinations. Table V shows the batch 0.2 percent Zn, 0.4 percent Cd Test 509 to be optimum among the zinc-bearing phosphors in these out-of-lamp plaque tests, and $Zn_3(PO_4)_2 \cdot 4H_2O$ appears to be the optimum source of zinc, while $\beta$-$Ca_{2.7}Zn_{0.3}(PO_4)_2$ seems undesirable. This table is divided into sections, as indicated, showing results from starting with different sources of zinc which are: $Zn_3(PO_4)_2 \cdot 4H_2O$, $7ZnO \cdot Sb_2O_5$, $ZnNH_4PO_4$, $ZnCO_3$, $ZnO$, $\beta\text{-}Ca_{2.7}Zn_{0.3}(PO_4)_2$, and, for the three final tests, no zinc-containing additive was used. Other zinc compounds that might be found suitable include zinc oxylate, acetate, hydroxide, halides, sulfates, and others.

from a small amount effective to improve light-output maintenance to about 0.35 mole percent divalent zinc, relative to the total divalent ion content.

8. A fluorescent lamp according to claim 7 in which the calcium halophosphate phosphor contains between about 0.05 and 0.35 mole percent divalent zinc, relative to the total divalent ion content.

9. In the manufacture of calcium halophosphate phosphor by firing a batch of ingredients which will produce the phosphor, the step which comprises adding to the batch a source of zinc in amount sufficient to provide in the resulting phosphor from a small amount effective to improve light-output maintenance to about 0.35 mole percent divalent zinc, relative to the total divalent ion content, and wherein said source of zinc is at least one compound selected from the group consisting of:

$Zn_3(PO_4)_2 \cdot 4H_2O$
$7ZnO \cdot Sb_2O_5$
$ZnNH_4PO_4$
$ZnCO_3$ and
$ZnO$

10. A process according to claim 9 wherein the selected compound is $Zn_3(PO_4)_2 \cdot 4H_2O$

TABLE V.—PLAQUE BRIGHTNESS AND RESISTANCE TO 1849 A.

| Test | Percent added | | Firing temp. (° C.) | Sol. Sb (wgt. percent) | Percent retained | | Init. bright. | Bright. after 1,849 A | Sample loss | CWH loss | Δ from CWH |
|---|---|---|---|---|---|---|---|---|---|---|---|
| | Zn | Cd | | | Zn | Cd | | | | | |
| $Zn_3(PO_4)_2 \cdot 4H_2O$ | | | | | | | | | | | |
| 521 | 0.3 | 0.0 | 1,160 | 0.85 | 0.16 | | 103.2 | 95.6 | 7.6 | 7.6 | 0 |
| 522 | 0.3 | 0.0 | 1,100 | 0.94 | 0.16 | | 104.2 | 97.5 | 6.7 | 7.6 | 0.9 |
| 488 | 0.4 | 0.0 | 1,100 | 0.94 | 0.26 | | 100.8 | 94.9 | 5.9 | 6.1 | 0.2 |
| 496 | 0.4 | 0.0 | [1] 1,100 | 0.91 | 0.25 | | 101.1 | 94.8 | 6.3 | 6.7 | 0.4 |
| 500 | 0.4 | 0.0 | 1,160 | 0.89 | 0.28 | | 98.7 | 93.3 | 5.4 | 6.0 | 0.6 |
| 489 | 0.6 | 0.0 | 1,100 | 0.99 | | | 96.7 | 90.4 | 6.3 | 6.2 | −0.1 |
| 505 | 0.1 | 0.5 | 1,105 | 0.97 | 0.06 | 0.39 | 103.3 | 97.9 | 5.4 | 5.7 | 0.3 |
| 506 | 0.2 | 0.5 | 1,105 | 0.94 | 0.12 | 0.41 | 101.6 | 96.3 | 5.3 | 5.7 | 0.4 |
| 509 | 0.2 | 0.4 | 1,105 | 0.91 | 0.11 | 0.34 | 102.9 | 94.0 | 5.9 | 7.2 | 1.3 |
| 511 | 0.3 | 0.4 | 1,100 | 0.98 | 0.16 | | 101.0 | 94.6 | 6.4 | 6.5 | 0.1 |
| $7ZnO \cdot Sb_2O_5$ | | | | | | | | | | | |
| 490 | 0.4 | 0.0 | 1,100 | 0.99 | | | 100.0 | 93.9 | 6.1 | 6.2 | 0.1 |
| 491 | 0.6 | 0.0 | 1,100 | 0.98 | | | 95.9 | 89.5 | 6.4 | 6.5 | 0.1 |
| $ZnNH_4PO_4$ | | | | | | | | | | | |
| 492 | 0.4 | 0.0 | 1,100 | 0.85 | | | 99.8 | 94.1 | 5.7 | 6.0 | 0.3 |
| 493 | 0.6 | 0.0 | 1,100 | 0.98 | | | 96.9 | 90.6 | 6.3 | 6.0 | −0.3 |
| $ZnCO_3$ | | | | | | | | | | | |
| 494 | 0.4 | 0.0 | 1,100 | 0.90 | | | 97.5 | 92.3 | 5.2 | 6.3 | 1.1 |
| 498 | 0.4 | 0.0 | 1,100 | 0.91 | | | 98.5 | 92.8 | 5.7 | 6.7 | 1.0 |
| 495 | 0.6 | 0.0 | 1,100 | 0.85 | | | 98.9 | 93.0 | 5.9 | 6.3 | 0.4 |
| $ZnO$ | | | | | | | | | | | |
| 497 | 0.4 | 0.0 | 1,100 | 0.90 | | | 99.7 | 93.6 | 6.1 | 6.7 | 0.6 |
| 499 | 0.6 | 0.0 | 1,100 | 0.94 | | | 98.1 | 91.9 | 6.2 | 6.1 | −0.1 |
| $\beta\text{-}Ca_{2.7}Zn_{0.3}(PO_4)_2$ | | | | | | | | | | | |
| 501 | 0.4 | 0.0 | 1,100 | 0.71 | | | 99.9 | 93.0 | 6.9 | 6.1 | −0.8 |
| 510 | 0.4 | 0.0 | 1,160 | 0.67 | | | 100.9 | 93.4 | 7.5 | 7.3 | −0.2 |
| 502 | 0.6 | 0.0 | 1,100 | 0.63 | | | 98.3 | 91.4 | 6.9 | 5.8 | −1.1 |
| None | | | | | | | | | | | |
| 486 | 0.0 | 0.0 | 1,095 | 0.85 | 0.00 | | 103.8 | 95.4 | 8.4 | 6.1 | −2.3 |
| 503 | 0.0 | 0.5 | 1,100 | 0.93 | | 0.35 | 103.3 | 96.6 | 6.7 | 5.8 | −0.9 |
| 487 | 0.0 | 1.0 | 1,100 | 0.94 | 0.00 | 0.70 | 102.2 | 97.7 | [2] 4.5 | 5.9 | 1.4 |

[1] 2 hours.   [2] Normally 5–5.5.

While specific examples have been given of phosphors, lamps and methods of the invention, it will be understood that changes, omissions, and substitutions may be made within the true spirit and scope of the invention as defined in the appended claims.

What we claim as new and desire to secure by Letters Patent of the United States is:

1. A calcium halophosphate phosphor containing from a small amount effective to improve light-output maintenance to about 0.35 mole percent divalent zinc, relative to the total divalent ion content.

2. A calcium halophosphate phosphor containing between about 0.05 and 0.35 mole percent divalent zinc, relative to the total divalent ion content.

3. A phosphor according to claim 1 also containing about from 0.01 to 0.5 mole percent divalent cadmium, relative to the total divalent ion content.

4. A phosphor according to claim 2 also containing about from 0.01 to 0.5 mole percent divalent cadmium, relative to the total divalent ion content.

5. A phosphor according to claim 4 containing about 0.06 mole percent zinc and about 0.4 mole percent cadmium, both relative to the total divalent ion content.

6. A phosphor according to claim 2 containing about 0.16 mole percent zinc, relative to the total divalent ion content.

7. A fluorescent lamp comprising a sealed envelope, electrodes therein, a filling of ionizable starting gas at low pressure therein, mercury therein, and a coating of phosphor on the inside surface of said envelope, said phosphor comprising calcium halophosphate containing

References Cited

UNITED STATES PATENTS 2,965,786   12/1960   Aia et al.

FOREIGN PATENTS 518,348   11/1955   Canada.
692,046   8/1964   Canada.

TOBIAS E. LEVOW, *Primary Examiner.*

J. COOPER, *Assistant Examiner.*

U.S. Cl. X.R.

252—301.4, 301.6